United States Patent

Slater

[15] 3,639,261
[45] Feb. 1, 1972

[54] PROCESS FOR THE GENERATION OF SYNTHESIS GAS FROM OIL

[72] Inventor: William L. Slater, La Habra, Calif.
[73] Assignee: Texaco Inc., New York, N.Y.
[22] Filed: Mar. 27, 1968
[21] Appl. No.: 716,448

[52] U.S. Cl. ............................................. 252/373, 48/215
[51] Int. Cl. ......................................................... C01b 2/14
[58] Field of Search ........................... 252/373; 48/215, 196

[56] References Cited

UNITED STATES PATENTS

| | | | |
|---|---|---|---|
| 2,809,104 | 10/1957 | Strasser et al. | 252/373 UX |
| 2,914,418 | 11/1959 | Eastman | 252/373 UX |
| 2,980,523 | 4/1961 | Dille et al. | 252/373 UX |
| 3,010,813 | 11/1961 | Clarke et al. | 252/373 UX |
| 3,016,986 | 1/1962 | Dille et al. | 48/215 UX |
| 3,022,148 | 1/1962 | James | 48/215 |
| 3,044,179 | 7/1962 | Chapman et al. | 252/373 UX |
| 3,097,081 | 7/1963 | Eastman et al. | 252/373 UX |
| 3,097,082 | 7/1963 | Guptill | 48/215 |
| 3,147,093 | 9/1964 | Dille et al. | 252/373 X |
| 3,232,728 | 2/1966 | Reynolds | 252/373 UX |

*Primary Examiner*—Howard T. Mars
*Attorney*—K. E. Kavanagh and Thomas H. Whaley

[57] ABSTRACT

Process for the production of synthesis gas from hydrocarbon liquids by direct partial oxidation with oxygen-containing gas and steam wherein oil containing carbon recovered from the process is supplied to a flow-type synthesis gas generator maintained at an autogenous temperature within the range of 1,800–3,000° F., effluent gas from the reaction zone is cooled by indirect heat exchange to a temperature above the dew point of the product gas stream, and the product gas stream scrubbed with liquid hydrocarbon at a temperature above the dew point of water vapor contained in said product gas and below the boiling point the hydrocarbon liquid and resulting hydrocarbon liquid containing recovered carbon is supplied to the gas generation zone as part of the feedstock for the production of synthesis gas.

3 Claims, 1 Drawing Figure

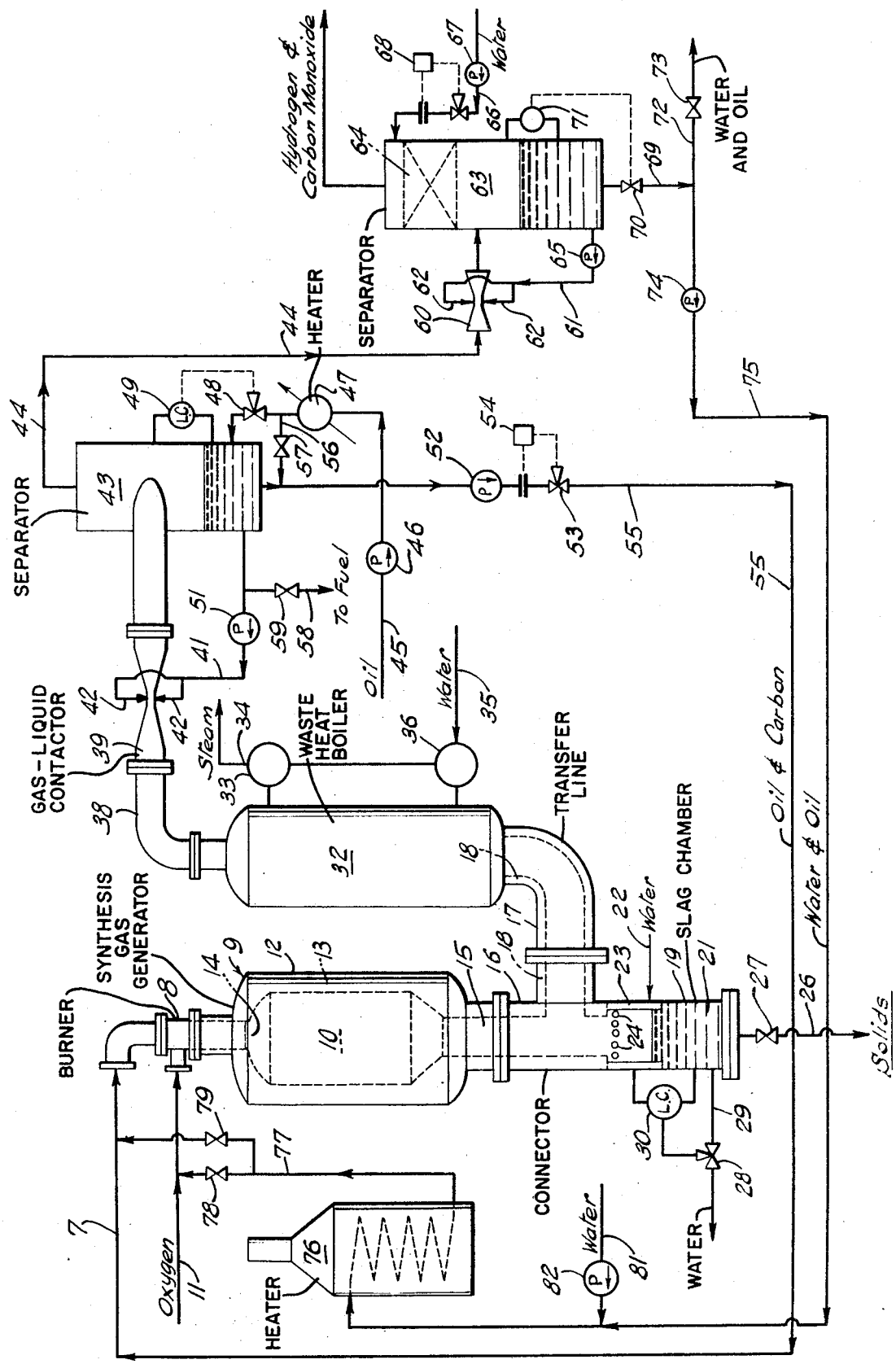

PROCESS FOR THE GENERATION OF SYNTHESIS GAS FROM OIL

This invention relates to a process for the production of carbon monoxide and hydrogen, i.e., synthesis gas, from liquid hydrocarbons by partial oxidation with an oxygen-containing gas. In one of its more specific aspects, the present invention relates to noncatalytic process for generating synthesis gas in which the hot gas is cooled from gas generator temperature to a temperature above the dew point of the gas stream and then contacted with hot oil at a temperature above the dew point to effect the removal of carbon therefrom. In one of its still more specific aspects, the invention relates to a method of generating synthesis gas by direct partial oxidation of a hydrocarbon oil by reaction with oxygen and steam wherein unconverted carbon is removed from the hot synthesis gas generator effluent by scrubbing with hot oil to form a slurry of carbon in oil which is returned to the synthesis gas generator as at least a part of the feed therefor and thereafter the clean, cooled gas stream is contacted with water to insure removal of hydrocarbon oil vapors from the gas stream.

The generation of carbon monoxide and hydrogen, or synthesis gas, by noncatalytic reaction of hydrocarbon liquids with oxygen or oxygen-enriched air in the presence of steam or carbon dioxide is known. Partial oxidation of liquid hydrocarbons, especially heavy fuel oils, represents a highly economical method for the production of synthesis gas in large quantities. In the partial oxidation process, hydrocarbon is reacted with oxygen-containing gas in a closed, compact reaction zone in the absence of catalyst or packing at an autogenous temperature within the range of about 1,800° to 3,200° F., preferably in the range of about 2,200° to 2,800° F. With hydrocarbon oils as feedstock for the process, a moderator, such as steam or carbon dioxide, is used to control the reaction zone temperature within the indicated range. The hydrocarbon oil is usually preheated and may be partly or completely vaporized and mixed with or dispersed in steam. Such hydrocarbon oil and steam mixtures or dispersions are usually preheated to a temperature in the range of 500° to 800° F., generally to a temperature of at least 600° F., whereas oxygen usually is not preheated. The reaction zone is usually maintained at a pressure above about 100 pounds per square inch gauge, e.g., 600 to 1,000 p.s.i.g.; recent trends are toward higher operating pressures up to about 2,500 to 3,000 p.s.i.g. The product gas stream consists primarily of carbon monoxide and hydrogen and contains relatively small amounts of carbon dioxide, methane and entrained carbon. Solid carbon produced in the process is liberated in very fine particle form which is easily wet by water or oil. Preferably, the gas generation step and cooling and scrubbing operations are carried out at substantially equal pressure within the range of 100 to 3,000 p.s.i.g.

The amount of oxygen supplied to the reaction zone is limited so that near maximum yields of carbon monoxide and hydrogen are obtained. Usually it is preferable to employ high purity oxygen, i.e., oxygen-rich gas streams containing in excess of 95 percent oxygen by volume. Such oxygen concentrations are readily available from commercial oxygen plants.

Product gases issuing from the gas generation reaction zone contain a large quantity of heat. The heat may be employed advantageously to convert water to steam by passing the hot gas stream through a suitable heat exchanger, such as a waste heat boiler.

Generally it is desirable, for maximum efficiency of oxygen utilization to operate the synthesis gas generator so that from about one half to about two percent of the carbon contained in the hydrocarbon supplied to the gas generator is liberated as free carbon which is entrained in the product gas leaving the gas generator. Entrained carbon in the synthesis gas stream may be removed effectively by contacting the gas stream with water in a suitable gas-liquid contacting apparatus, for example, a spray tower, bubble plate contactor, or packed column. Scrubbing of the gas stream with water forms a slurry of carbon in water which is fluid and pumpable up to about 3 weight percent concentration of carbon in the slurry. Disposal of the slurry in many cases presents problems so that various methods have been devised for the recovery of carbon from the water slurry, usually by transferring the carbon to oil to form a slurry of carbon in oil which may be used as fuel for the synthesis gas generator or for other purposes. Suitable methods for recovering carbon from a water slurry are known and are described in detail, for example, in U.S. Pat., Nos. 2,999,741 to R. M. Dille et al. and No. 2,992,906 to F. E. Guptill, Jr.

The subject invention relates to an improved method for removal of carbon from synthesis gas wherein the carbon in directly transferred from the gas to oil thereby eliminating the necessity for costly and troublesome procedures for effecting the transfer of carbon from a carbon in water slurry to a hydrocarbon oil. The process of the present invention therefore represents an improvement over the conventional synthesis gas generation process as described above. The present method is particularly advantageous in that it permits the capture of carbon from the synthesis gas directly by a hydrocarbon oil thereby eliminating the necessity for the use of intermediate light distillate fractions, such as gasoline or naphtha as a carbon transfer medium. Although various hydrocarbon liquids are suitable as feedstocks for the generation of synthesis gas, hydrocarbon oils having an API gravity less than 10° API are preferred for economic reasons. Heavy fuel oils which are suitable for use in the process include, for example, heavy distillates, residual fuel oil, bunker fuel oil, No. 6 fuel oil, and fluid residua from various petroleum distillation and cracking process operations, and the like. Preferably the hydrocarbon liquid has an initial boiling point above about 400° F. which is utilized as feedstock for the synthesis gas generator.

The accompanying drawing is a diagrammatic elevational view of a suitable arrangement of apparatus by which a preferred embodiment of the process of this invention may be carried out.

With reference to the drawing, hydrocarbon feedstock from a suitable source, as described hereinafter, is supplied through line 7 to burner 8 of synthesis gas generator 9. In a preferred embodiment, the hydrocarbon oil feedstock supplied through line 7 contains carbon removed from the synthesis gas generator product by direct contact with the hydrocarbon oil feedstock as explained hereinafter. Steam from a suitable source of supply may be introduced, if desired, with the oil from line 7 as explained hereinafter. Oxygen from a suitable source of supply, optionally admixed with steam, enters burner 8 through line 11. Oil from line 7 is discharged in liquid phase through a central duct of burner 8 into admixture with oxygen from line 11 axially into the upper end of reaction zone 10 of gas generator 9. Details of burner structures suitable for use as burner 8 in the synthesis gas generator 9 are shown in U.S. Pat. Nos. 2,928,459 and 2,928,460, Eastman et al., issued Mar. 15, 1960. The synthesis gas generator 9 comprises a cylindrical pressure vessel 12 with a refractory lining 13 defining a cylindrical compact, unpacked reaction chamber 10. A reaction mixture from burner 8 comprising oil, carbon, steam, and oxygen, is injected axially into the upper end of reaction chamber 10 through inlet passageway 14. Products of reaction are discharged axially from the lower end of reaction zone 10 through an outlet passageway 15 into connector 16 and transfer line 17 both of which are provided with a suitable refractory lining 18.

In reaction zone 10 of synthesis gas generator 9, the mixture of oil, carbon, steam, and oxygen react at an autogenous temperature above 1,800° F., e.g., at a temperature in the range of 2,200° to 2,800° F., producing synthesis gas comprising carbon monoxide and hydrogen and containing minor amounts of carbon dioxide, inert atmospheric gases and solid carbon.

The relative proportions of oil, steam and oxygen are carefully regulated to convert substantially all of the carbon content of the hydrocarbon oil to carbon monoxide and to maintain an autogenous reaction zone temperature in the range of 1800° to 3000° F., preferably in the range of 2,200° to 2,800°

F. Small amounts of free carbon, e.g., 1 to 5 percent of the carbon in the feedstream from line 7 appears as solid carbon in the product gas stream. Also, small amounts of carbon dioxide, e.g., 5 to 7 mol percent of the product gas, dry basis, appear in the synthesis gas product. Usually, from 90 to 92 percent of the carbon in the hydrocarbon feed stream is converted directly to carbon monoxide. At least a part of carbon dioxide appearing in the product is the result of the water gas shift reaction. A small amount of methane, e.g., 0.2 to 0.5 mol percent, dry basis, is usually also present in the product gas stream. Some nitrogen and argon may also be included in the product gas depending upon the purity of the oil and oxygen supplied to the process.

Any ash contained in the hydrocarbon oil, for example ash liberated in the conversion of a heavy residuum to synthesis gas, is discharged from the lower part of the reaction zone 9 as ash or slag which is accumulated in slag chamber 19, dependent from connector 16. Any molten ash or slag discharged from outlet 15 of reaction chamber 10 drops directly into a pool of water 21 maintained in slag chamber 19 which effects quick cooling of the hot ash or slag from the generator and forms granular solid particles. Water is supplied to the slag accumulator 19 through line 22, flows through a water jacket 23 in the upper part of slag chamber 21 and is discharged through openings 24 into the interior slag chamber 19. Water jacket 23 protects from overheating that portion of slag chamber 19 which is above the level of the pool of water 21 and below the level of refractory lining 18 of connector 16. Accumulations of solid material, for example solidified slag or ash from the fuel, may be withdrawn as required from slag chamber 19 through line 26 as controlled by valve 27. The water level in slag chamber 21 suitably is controlled by discharging water therefrom through line 29 as controlled by valve 28 responsive to liquid level controller 30.

Hot product gases from gas generator 9 are passed through transfer line 17 to a waste heat boiler 32 wherein the gas stream is cooled by indirect heat exchange with water to a temperature above its dew point, e.g., to a temperature in the range of 400° to 550° F., generating high pressure steam which is delivered from steam drum 33 through line 34 for process use. Water for the waste heat boiler is supplied as required from line 35 to mud drum 36. Gases passing through the waste heat boiler contain entrained carbon particles produced in the synthesis gas generation.

Cooled product gas leaving waste heat boiler 32 is passed through transfer line 38 to a gas-liquid contactor 39 into which oil is injected from line 41 through injection nozzles 42. Intimate contact between product gas from line 38 and oil from line 41 is effected in contactor 39 which is preferably in the form of a venturi, but which may be in the form of a nozzle or plate orifice. In contactor 39, the gas stream is accelerated and oil injected into the accelerated gas stream at the throat of the venturi or orifice, from a plurality of nozzles 42, two of which are illustrated diagrammatically in the drawing. Both venturi and orifice contactors are known in the art.

Contacting or scrubbing of the gas stream with hydrocarbon liquid is carried out at a temperature above the dewpoint temperature of the product gas, e.g., at a temperature in the range of 350° to 500° F. Typically, the dewpoint of the product gas stream is within the range of 300° to 400° F. The hydrocarbon liquid used is preferably one having an initial atmospheric boiling point, above 300° F., preferably above 400° F. Generally, process fuel oil is suitable for scrubbing the product gas stream to effect carbon removal; the carbon-oil mixture from the gas scrubbing operation is suitable for use as process fuel. Oil rates in the range of 1 to 10 gallons per thousand cubic feet of gas may be employed; preferred oil rates are in the range of 2 to 5 gallons of oil per thousand cubic feet of gas.

The resulting mixture of gas and oil formed in contactor 39 is directed into separator 43 wherein separation is effected between cooled, clean product gas and oil-containing carbon removed from the product gas stream. Separator 43 is suitably a cyclone-type vessel from the upper end of which clean gas is discharged centrally and axially to line 44. Hydrocarbon oil, suitably oil feedstock for the synthesis gas generator, is supplied to separator 43 through line 45 by pump 46. The oil is passed through heater 47, suitably as controlled by a valve 48 responsive to a liquid level control 49, into the lower part of separator 43 where it is mixed with carbon in oil separated from the product gas stream.

A carbon-oil slurry is withdrawn from separator 43, part of which is passed by pump 51 through line 41 to injection Nozzles 42. The remainder of the carbon-oil slurry drawn from separator 43 is passed by pump 52, suitably as controlled by valve 53 in response to a rate of flow controller 54 through line 55 to line 7 as feed for the synthesis gas generator. Oil-containing carbon from separator 43 may make up all or part of the chargestock to generator 10. If desired, oil feedstock from line 45 may be passed through heater 47 and line 56 to pump 52 as controlled by valve 57. Carbon-oil slurry may be withdrawn through line 58 as controlled by line 59 for use as fuel.

Clean, cooled product gas discharged from separator 43 through line 44 is passed to a gas-liquid contactor 60 into which water is injected from line 61 through injection nozzles 62. In contactor 60, the product gas from line 44, which may contain some oil vapors and carbon particles carried over from separator 43, is intimately contacted with water from line 61. Contactor 60 suitably is a venturi or orifice contactor similar to contactor 39 in which the gas stream is accelerated and water injected into the accelerated gas stream at the throat of the venturi or orifice from a plurality of nozzles 62, two of which are illustrated diagrammatically in the drawing.

The resulting mixture of gas and water formed in contactor 60 is directed into separator 63 wherein separation is made between cooled, clean product gas and water containing residual oil and carbon removed from the product gas stream. Separator 63 is suitably a tower having a packed section 64 above the point of entry of the gas stream from contactor 60. Water is circulated from the lower part of separator 63 to contactor 60 by pump 65. Fresh water, e.g., condensate from the process system, is introduced into tower 63 from line 66 by pump 67, suitably at a rate controlled by a rate of flow controller 68. Water containing oil and carbon separated from the product gas stream accumulates in the lower portion of separator 63 and is withdrawn from separator 63 through line 69, suitably as controlled by valve 70 in response to liquid level control 71. Water from separator 63 may be drawn from the system through line 72 as controlled by valve 73 or may be passed by pump 74 through line 75 to heater 76 to supply steam to synthesis gas generator 9.

Preferably the temperature in the water scrubbing step is kept as high as possible consistent with effective removal of oil vapor from the gas stream. The water scrubbing temperature may be in the range of 100° to 500° F., preferably in the range of 300° to 450° F. Generally it is desirable to carry out the water scrubbing step at a temperature about 50° F. below the temperature of the oil scrubbing step. Water ratio in the range of 1 to 10 gallons per thousand cubic feet of product gas may be employed in the water scrubbing operation.

Heater 76, suitably of the monotube boiler type, converts water to steam for use in the process. Steam from heater 76 is passed through line 77 to either oxygen supply line 11 or to oil line 7 as determined by valves 78 and 79, respectively, as desired. Part or all of the steam required for the synthesis gas generation may be supplied from the water withdrawn from separator 63 or part or all of the steam may be generated from fresh water supplied through line 81 by pump 82. When it is desired to supply steam to the synthesis gas generator mixed with the oil from line 7, part or all of the steam is advantageously made from water containing oil drawn from separator 63. If steam is to be supplied to the oxygen line, it should not contain any oil vapors and in this case, it is preferable to supply all fresh water from line 81.

EXAMPLE

Process fuel oil having an 8.80 API gravity is preheated to 235° F. and charged to a 1.85 cubic foot reaction zone flow-type synthesis gas generator at the rate of 457.4 pounds (54.4 gallons) per hour. Oxygen of 99.7 volume percent purity is preheated to 400° F. and supplied at the rate of 5,500 standard cubic feet per hour in admixture with 215.8 pounds per hour of 912° F. process steam to the reaction zone. The resulting mixture of oil, steam and oxygen reacts in the generator to maintain autogenous temperatures in the range of 2,200° to 2,500° F. at 1260 p.s.i.g.

Product gas discharged from the reaction zone at 2,200° F. and at the rate of 22,485 standard cubic feet per hour has the following composition, expressed in volume percent or mol percent (dry basis).

| | |
|---|---|
| Carbon monoxide | 45.27 |
| Hydrogen | 45.05 |
| Carbon dioxide | 6.36 |
| Methane | 0.79 |
| Nitrogen | 0.33 |
| Hydrogen Sulfide | 0.14 |
| Argon | 0.06 |
| Carbon (% of C in fuel) | 1.63 |

The raw product gas from the generator contains 6.88 mol percent water vapor (83.05 pounds per hour). The product gas stream has a dewpoint of 318° F. and contains 6.5 pounds per hour of free carbon produced as a byproduct.

Product gas from the synthesis gas generator is cooled to 500° F. by indirect heat exchange in a waste heat boiler and contacted in a venturi contactor and separator with 8.8° API fuel oil as used for the process fuel. Direct contact with oil cools the product gas to about 470° F. and removes soot from the gas stream. Oil is charged to the venturi contactor-separator at the rate of 2.3 gallons of oil per thousand cubic feet of dry gas, or 51.7 pounds per hour. Carbon laden fuel oil is withdrawn from the quench contactor at the same rate, the oil containing 1.42 weight percent of carbon. Unconverted carbon in the product gas amounted to 1.63 weight percent of the carbon in the feed.

An important advantage of the present method of operation of a synthesis gas generator wherein carbon is removed from the product gas stream by scrubbing with hydrocarbon oil is that this method eliminates the necessity for recovering carbon from quench water as in conventional operation of the synthesis gas generation process. My method eliminates the necessity for a number of heat exchangers and separation vessels ordinarily required and makes practical the use of a waste heat boiler to utilize heat contained in the hot synthesis gas directly for production of high pressure steam.

I claim:

1. In a process for the production of carbon monoxide and hydrogen by the partial oxidation of a feedstock comprising a liquid hydrocarbon fuel with an oxygen-rich gas and steam in a reaction zone of a noncatalytic unpacked synthesis gas generator at an autogenous temperature within the range of 1,800° to 3,000° F. with the incidental production of free carbon, the improvement which comprises cooling the effluent gas stream from said reaction zone to a temperature in the range of about 400°–550° F. and above the dew point of water vapor in said effluent gas stream by indirect heat exchange in a gas cooling zone; introducing the effluent gas stream leaving the cooling zone into a gas scrubbing zone, contacting said effluent gas stream therein with a scrubbing fluid produced subsequently in the process at a temperature above the dew point of the effluent gas and in the amount of about 1 to 10 gallons of scrubbing fluid per thousand cubic feet of effluent gas thereby simultaneously cooling said effluent gas stream without condensing water vapor contained therein and removing substantially all of the particulate carbon from said effluent gas stream as a hot pumpable liquid hydrocarbon fuel-particulate carbon slurry; separating the scrubbed effluent gas stream from said hot pumpable slurry in a gas-liquid separating zone; mixing fresh liquid hydrocarbon fuel with said pumpable slurry and introducing a portion of said mixture into said gas scrubbing zone as said scrubbing fluid, and introducing a second portion of said mixture into the reaction zone of said synthesis gas generator as at least a portion of said feedstock.

2. The process of claim 1 with the added steps of scrubbing the effluent gas stream leaving said gas-liquid separating zone with water at a temperature in the range of about 100° to 500° F. and in the amount of about 1 to 10 gallons of water per thousand cubic feet of effluent gas thereby removing any remaining particulate carbon, condensing hydrocarbon oil vapors from said effluent gas stream and producing a mixture of water and oil, vaporizing a portion of said water and oil mixture in a heating zone forming a steam-oil vapor mixture, and introducing said steam-oil vapor mixture into said reaction zone of the gas generator as at least a portion of said steam and liquid hydrocarbon fuel.

3. A process according to claim 1 wherein said gas generation step and said cooling and scrubbing operations are carried out at substantially equal pressure within the range of 100 to 3,000 p.s.i.g.

* * * * *